United States Patent Office 3,313,775
Patented Apr. 11, 1967

3,313,775
PROCESS FOR MANUFACTURING GLYCIDYL ETHERS OF POLYHYDRIC PHENOLS
Helmut J. Fränkel, Kelkheim, near Frankfurt, Germany, assignor to Shell Oil Company, New York, N.Y., a corporation of Delaware
No Drawing. Filed Aug. 16, 1963, Ser. No. 302,738
Claims priority, application Germany, Aug. 23, 1962, S 81,071
9 Claims. (Cl. 260—47)

This invention relates to an improved process for the manufacture of glycidyl ethers. More particularly, the invention relates to a new process for producing solid glycidyl ethers of polyhydric phenols having little if any color.

Specifically, the invention provides a new and highly efficient process for preparing solid light colored glycidyl polyethers of polyhydric phenols which comprises preparing an aqueous slurry of a polyhydric phenol and a halohydrin of the group consisting of epihalohydrin and glycerol halohydrin and adding to this mixture with stirring an aqueous alkali metal hydroxide solution, not more than 1.75 mol of the halohydrin being present per mol of polyhydric phenol.

There are several known methods for preparing solid glycidyl ethers of polyhydric phenols. One method comprises adding epichlorohydrin to an alkaline solution of a polyhydric phenol. Although this process leads to the desired products, the resultant ethers are invariably characterized by a certain color which greatly limits their application in several fields. The colored ethers are, for example, not suited for use in paints and lacquer combinations where white or light colored products are desired.

It is an object of the invention, therefore, to provide a new process for preparing glycidyl ethers. It is a further object to provide a process for preparing solid glycidyl ethers of polyhydric phenols having improved properties. It is a further object to provide a process for preparing solid glycidyl ethers having a very light color. It is a further object to provide a new process for preparing solid glycidyl ethers that may be used in making white or light colored surface coating compositions. It is a further object to provide new light colored solid glycidyl ethers. These and other objects will be apparent from the following detailed description thereof.

It has now been discovered that these and other objects may be accomplished by the process of the invention comprising preparing an aqueous slurry of a polyhydric phenol and a halohydrin of the group consisting of epihalohydrin and glycerol halohydrin, and adding to this mixture with stirring an aqueous alkali metal hydroxide solution, not more than 1.75 mol of the halohydrin being present per mol of polyhydric phenol. It was surprisingly found that by the use of this special technique, solid glycidyl ethers of polyhydric phenols may be obtained which possess no color or hardly any color. The products prepared by this new process, therefore, are eminently suited for many applications, such as, for example, the preparation of white, light colored or even transparent protective coatings or paints where the known colored glycidyl ethers are unsatisfactory.

In the first step of the process, one prepares an aqueous slurry of the polyhydric phenol and the halohydrin. This is accomplished by merely adding the components together and stirring. It is generally preferred to first combine the polyhydric phenol and the water and then add the halohydrin, but the halohydrin may be added first if so desired or both components added together. The amount of the polyhydric phenol and halohydrin to be combined with the water in making the slurry may vary over a wide range. In general, the combined concentration of the phenol and halohydrin in the slurry will vary from about 20% to about 75%, and more preferably from about 40% to about 55% by weight.

The ratio of the polyhydric phenol and halohydrin to be used in making the slurry may also vary within certain limits. Thus, one should utilize not more than 1.75 mol of halohydrin per mol of polyhydric phenol, and preferably from 0.1 to 1.6 mol of halohydrin per mol of polyhydric phenol. As the amount of the halohydrin is decreased, the molecular weight of the resulting resin will increase. For example, using epichlorohydrin and 2,2-bis(4-hydroxyphenyl)propane, a ratio of epi. to the phenol of say 1.4 will generally give a product having a molecular weight of about 790 with a softening point of about 84° C., a ratio of 1.33 will give a product of molecular weight of about 800 with a softening point of about 90° C., a ratio of 1.25 will give a product having a molecular weight of about 1.130 and a softening point of about 100° C.

The temperature used in making the slurry preferably varies from about 25° C. to about 75° C., and still more preferably from about 30° C. to 60° C.

As the components have limited solubility in the water, stirring will be required to form the desired slurry. This is preferably accomplished by use of conventional stirring, e.g., 50 to 1000 r.p.m. with standard stirring equipment.

When the aqueous slurry of the polyhydric phenol and halohydrin has been prepared, the aqueous alkali hydroxide solution is then added. While any of the alkali metal hydroxides may be employed, it is generally preferred to employ sodium hydroxide, potassium hydroxide or lithium hydroxide.

The concentration of the aqueous alkali hydroxide solution utilized may vary within certain limits. The concentration preferably varies from about 5% to 45%, and more preferably from about 10% to 30% by weight.

The total amount of alkali metal hydroxide used in the process is an equivalent of the hydroxide per equivalent of the halohydrin reacted. This amount of hydroxide is ordinarily somewhat less than the phenolic hydroxyl equivalents of the phenol in the reaction mixture. This is because the higher ether products require less than this equivalent amount of hydroxide. Thus, for example, one resin results from the reaction of 3 moles of epichlorohydrin with 2 mols of phenol and only 1.5 moles of epichlorohydrin are reacted per mole of the phenol, and consequently only 1.5 moles of the hydroxide is required. The important point is that sufficient hydroxide as a whole should be used that the ether product is substantially free of organically bound chlorine and that the reaction mixture is substantially neutral. If glycerol dichlorohydrin is employed as reactant, additional alkali metal hydroxide will be needed to bring about in situ formation of epichlorohydrin, e.g., an additional mol of alkali metal hydroxide per mol of dichlorohydrin.

When using dihydric phenols, the amount of the alkali metal hydroxide will preferably vary from about .2 to 2 moles of alkali per mol of the dihydric phenol.

The addition of the aqueous alkali metal hydroxide is preferably accomplished with stirring and at temperatures generally ranging from about 30° C. to 80° C., and still more preferably at temperatures ranging from about 40° C. to 60° C.

After the addition of the hydroxide, the exothermic etherification reaction will take place. It is generally preferred to maintain the temperature below say about 125° C. as by cooling whenever desired or necessary.

The etherification is preferably effected in the absence of oxygen, to which end the reaction vessel is suitably purged with an inert gas, such as nitrogen, before the etherification starts and an atmosphere of this inert gas is maintained during the etherification. The etherification is also advantageously effected in the presence of sodium dithionite, thereby considerably shortening the drying time of the isolated and washed ether.

In order to isolate the resulting ethers, the ether liquid is preferably removed by suction, the ether washed with water under pressure, the resulting alkali chloride separated and the ether subsequently dried.

The resulting product will be a solid glycidyl polyether of the polyhydric phenol having no color or very little color. The products may be represented by the following formula

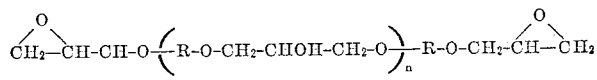

wherein R represents the residue of the dihydric phenol after removal of the phenolic OH groups and $n$ varies depending on the molecular weight. Preferred products having molecular weights above about 700 and preferably 800 to 2000, and a Durrans' softening point of at least 50° C.

The products will be substantially colorless as represented by a color rating of less than 1 when rated on the Gardner scale.

The solid glycidyl ethers obtained by the process of the invention may be used for a variety of important applications, such as in formation of adhesives, pottings castings and the like. In these applications, they are, of course, mixed with conventional curing agents, such as polyamines, polybasic acid anhydrides, salts, polymercaptans, and the like, preferably with the application of heat. Under these conditions, the products are converted to hard insoluble infusible castings having excellent resistance to chemicals and the like.

As noted above, the glycidyl ethers prepared by the present process have very little if any color and are ideally suited for use in making surface coatings as lacquers or paints, enamels and the like, which are to be used as transparent, white or light colored films. In these applications they may be combined with conventional curing agents as noted above, solvents, pigments and the like and spread out to form the necessary protective film. Typical methods for using the glycidyl ethers in such applications may be found in U.S. 2,500,449 and 2,541,027.

The process of the invention is applicable for efficient production of glycidyl ethers of any suitable polyhydric phenol. Typical phenols include those having phenolic hydroxyl groups attached to non-adjacent ring carbon atoms such as resorcinol, hydroquinone, chlorohydroquinones, methyl resorcinol, phloroglucinol, 1,5-dihydroxynaphthalene, 4,4'-dihydroxydiphenyl, bis(hydroxyphenyl)methane, 1,1-bis(4-hydroxyphenyl)ethane, 1,1-bis(4-hydroxyphenyl)isobutane, 2,2 - bis(4 - hydroxyphenyl)propane, which is termed bis-phenol herein for convenience, 2,2-bis(2-hydroxy-4-tert-butylphenyl)propane, 2,2-bis(2-hydroxyphenyl)propane, 2,4-dihydroxydiphenyldimethylmethane, 2,2-bis(2-chloro-4-hydroxyphenyl)propane, 2,2-bis(2-hydroxynaphthyl)pentane, 2,2-bis(2,5-dibromo - 4-hydroxyphenyl)butane, 4,4'-dihydroxybenzophenone, 1,3-bis(4-hydroxyphenyloxy) - 2 - hydroxypropane, 3 - hydroxyphenyl salicylate, 4-salicoylaminophenol, as well as more complex polyhydric phenols such as novolac resins obtainable by acid catalyst condensation of phenol, p-cresol, or other substituted phenols with aldehydes such as formaldehyde, acetaldehyde, crotonaldehyde, etc.; condensates of phenols with cardanol such as described in U.S. 2,317,607; condensates of phenols with aliphatic diols such as described in U.S. 2,321,620; and condensates of phenols with unsaturated fatty oils such as described in U.S. 2,031,586. The polyhydric phenols contain 2 or more phenolic hydroxyl groups in the average molecule thereof and are free of other functional groups which would interfere with formation of the desired glycidyl ethers. The epihalohydrin or glycerol halohydrin employed is preferably the chlorine derivative.

To illustrate the manner in which the invention may be carried out, the following examples are given. It is to be understood, however, that the examples are for the purpose of illustration and the invention is not to be regarded as limited to any of the specific conditions recited therein.

EXAMPLE I 1384 kilograms of a 25% caustic soda solution containing 100 grams of sodium dithionite were added continuously in the course of 15 minutes with stirring to a mixture of 1100 kg. of 2,2-bis(4-hydroxyphenyl)propane, 700 kg. of epichlorohydrin, and 2080 kg. of water in a reaction vessel in a nitrogen atmosphere. The temperature of the mixture before adding the caustic soda solution was 52° C.

After completion of the exothermic reaction (1 hour) during which the temperature rose to 102° C., the resultant mother liquid containing sodium chloride formed and excess caustic soda was siphoned off, and the resin slurry was washed with water for 2 hours at temperatures of 75–85° C. and subsequently dried (drying time 2 hours).

The resultant solid ether had a Durrans' Mercury softening point of 68° C., an epoxy equivalency of 100/480 per 100 g. of resin and a color of <1 (Gardner scale). The ether was dissolved in dioxane and combined with an equivalent amount of diethylene triamine. The resulting mixture was spread out on wood panels and cured at room temperature to form a hard clear coating.

EXAMPLE II 1264 kg. of a 25% caustic soda solution containing 100 g. of sodium dithionite were added continuously in the course of 15 minutes with stirring to a mixture of 1300 kg. of 2,2-bis(4-hydroxyphenyl)propane, 650 kg. of epichlorohydrin and 1896 kg. of water in a reaction vessel in a nitrogen atmosphere. The temperature of the mixture before adding the caustic soda solution was 46° C.

After completion of the exothermic reaction (1 hour), during which the temperature rose to 102° C., the resultant mother liquid containing sodium chloride formed and excess caustic soda was siphoned off, and the resin slurry was washed with water for 2 hours at 100–115° C. and subsequently dried (drying time approximately 3 hours 10 minutes).

The resultant solid ether had a Durrans' Mercury softening point of 100° C., an epoxy equivalency of 100/930 per 100 g. of resin and a color of <1 (Gardner scale). This ether was used to prepare a clear surface coating as in Example I.

EXAMPLE III 1264 kg. of a 25% caustic soda solution (without addition of sodium dithionite) were added continuously in the course of 15 minutes with stirring to a mixture of 1300 kg. of 2,2-bis(4-hydroxyphenyl)propane, 650 kg. of epichlorohydrin and 1896 kg. of water in a reaction vessel in a nitrogen atmosphere. The temperature of the mixture before adding the caustic soda solution was 46° C.

After completion of the exothermic reaction (1 hour), during which the temperature rose to 102° C., the resultant mother liquid containing sodium chloride formed and excess caustic soda was siphoned off and the resin slurry was washed with water for 2 hours at 100–115° C. and subsequently dried (drying time 4 hours 50 minutes).

The resultant solid ether had a Durrans' Mercury softening point of 100° C., an epoxy-equivalency of 100/950 per 100 g. of resin and a color of <1 (Gardner scale). This ether was used to make pigmented white paint using diethylene triamine as curing agent.

EXAMPLE IV

This example illustrates the poor results as to color obtained by using the conventional technique for preparing glycidyl ethers.

1300 kg. of 2,2-bis(4-hydroxyphenyl)propane was dissolved in 3160 kg. of a 10% caustic soda solution at 60° C., 650 kg. of epichlorohydrin being added in about 1 minute with stirring after the solution was pumped into a reaction vessel. The temperature of the solution before adding the epichlorohydrin was 52° C.

After completion of the exothermic reaction (1 hour) during which the temperature rose to 102° C., the resultant mother liquid containing sodium chloride formed and excess caustic soda was siphoned off and the resin slurry was washed with water for 2 hours at 100–115° C. and subsequently dried (drying time 4 hours 50 minutes).

The resultant solid ether had a Durrans' Mercury softening point of 100° C., an epoxy-equivalency of 100/950 per 100 g. of resin and a color of 3 (Gardner scale).

EXAMPLE V

Example I is repeated using resorcinol in place of 2,2-bis(4-hydroxyphenyl)propane. Related results are obtained.

EXAMPLE VI

Example I is repeated using an equivalent amount of glycerol dichlorohydrin and the appropriate amount of NaOH. Related results are obtained.

I claim as my invention:

1. A process for preparing solid glycidyl ethers of polyhydric phenols having very light color which comprises forming an aqueous slurry of the polyhydric phenol and a halohydrin of the group consisting of epihalohydrin and a glycerol halohydrin of the formula

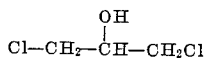

adding an aqueous alkali hydroxide solution to the slurry in sufficient amount to effect a removal of substantially all of the organically bound chlorine from the product and make the reaction mixture substantially neutral, at least 0.1 mol but not more than 1.75 moles of halohydrin being present per mol of the polyhydric phenol, and at the conclusion of the reaction removing the aqueous layer, washing and drying the remaining solid glycidyl ether.

2. A process as in claim 1 wherein the water and polyhydric phenol are first combined and then the halohydrin added thereto to form the initial aqueous slurry.

3. A process as in claim 1 wherein the aqueous alkali hydroxide is employed in a 10% to 30% concentration.

4. A process as in claim 1 wherein the reaction temperature at the beginning of the reaction is maintained in the range of from 30° C. to 60° C.

5. A process as in claim 1 wherein the reaction is carried out in the substantial absence of molecular oxygen.

6. A process as in claim 1 wherein the reaction is carried out in the presence of sodium dithionite.

7. A process for perparing a solid glycidyl ether of a polyhydric phenol having a Durrans' melting point of at least 50° C. and a very light color which comprises forming a slurry of water, polyhydric phenol and epichlorohydrin wherein there is at least 0.1 mol but not more than 1.75 moles of the epichlorohydrin per mol of polyhydric phenol, adding thereto aqueous alkali metal hydroxide solution of concentration between 10 to 30% concentration so as to furnish approximately one equivalent of hydroxide per equivalent of epichlorohydrin reacted, and maintaining the reaction at a temperature between 30 and 60° C., and at the conclusion of the reaction removing the aqueous layer, washing and drying the remaining solid glycidyl ether as the desired product.

8. A process as in claim 7 wherein the polyhydric phenol is 2,2-bis(4-hydroxyphenyl)propane.

9. A process as in claim 7 wherein the polyhydric phenol is a dihydric phenol and the amount of alkali metal hydroxide employed varies from 0.2 to 2.0 moles per mol of the dihydric phenol.

References Cited by the Examiner
UNITED STATES PATENTS 2,682,515   6/1954   Naps _____ 260—47

WILLIAM H. SHORT, *Primary Examiner.*

T. D. KERWIN, *Assistant Examiner.*